US012663705B2

(12) United States Patent
Chang et al.

(10) Patent No.: US 12,663,705 B2
(45) Date of Patent: Jun. 23, 2026

(54) ILLUMINATION SYSTEM AND PROJECTION DEVICE

(71) Applicant: Coretronic Corporation, Hsin-Chu (TW)

(72) Inventors: Jui Chang, Hsin-Chu (TW); Kuan-Ta Huang, Hsin-Chu (TW); Jo-Han Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 284 days.

(21) Appl. No.: 18/363,705

(22) Filed: Aug. 1, 2023

(65) Prior Publication Data

US 2024/0045316 A1    Feb. 8, 2024

(30) Foreign Application Priority Data

Aug. 4, 2022    (CN) .......................... 202210930829.6

(51) Int. Cl.
*G03B 33/12*        (2006.01)
*G03B 21/20*        (2006.01)
(52) U.S. Cl.
CPC ......... *G03B 33/12* (2013.01); *G03B 21/2013* (2013.01); *G03B 21/2033* (2013.01); *G03B 21/2066* (2013.01)
(58) Field of Classification Search
CPC ........................... G03B 33/12; G03B 21/2013; G03B 21/2033; G03B 21/2066
See application file for complete search history.

(56) References Cited

U.S. PATENT DOCUMENTS 4,870,268 A        9/1989  Vincent et al.
2010/0033685 A1*   2/2010  Seo ...................... G11B 7/1356
                                                    353/31

(Continued)

FOREIGN PATENT DOCUMENTS

CN        1128068        7/1996
CN        102052604      5/2011

(Continued)

OTHER PUBLICATIONS

Translation of JP_S60150515_U (Year: 2025).*

(Continued)

*Primary Examiner* — Jerry L Brooks
(74) *Attorney, Agent, or Firm* — JCIPRNET

(57) ABSTRACT
An illumination system providing an illumination beam includes a light source module generating first to third color beams, a light splitting and combining element, a beam expanding and collimating module, a reflecting element, and a light combining module. The first and second color beams are reflected by the light splitting and combining element after being transmitted to the light splitting and combining element. Paths of the first and second color beams leaving the light splitting and combining element are coincident. The first and second color beams from the light splitting and combining element are expanded and collimated by the beam expanding and collimating module and transmitted to the light combining module. The third color beam is reflected by the reflecting element and transmitted to the light combining module. Paths of the first to third color beams after leaving the light combining module are coincident. A projection device is provided.

25 Claims, 10 Drawing Sheets

(56)                References Cited

U.S. PATENT DOCUMENTS

| | | | |
|---|---|---|---|
| 2011/0096298 A1 | 4/2011 | Huang et al. | |
| 2014/0333900 A1* | 11/2014 | Aboshi | G03B 21/2033 |
| | | | 353/38 |
| 2015/0168817 A1 | 6/2015 | Cobb et al. | |
| 2021/0191250 A1* | 6/2021 | Kurita | G03B 33/12 |
| 2022/0137497 A1 | 5/2022 | Hou et al. | |

FOREIGN PATENT DOCUMENTS

| | | |
|---|---|---|
| CN | 105980913 | 9/2016 |
| CN | 109100908 | 12/2018 |
| CN | 110018605 | 7/2019 |
| CN | 111435198 | 7/2020 |
| CN | 210954574 | 7/2020 |
| CN | 112114483 | 12/2020 |
| CN | 112987472 | 6/2021 |
| CN | 214278609 | 9/2021 |
| CN | 113805419 | 12/2021 |
| CN | 116068779 | 5/2023 |
| EP | 0325363 | 7/1989 |
| JP | S60150515 U * | 10/1985 |
| JP | 2001305484 | 10/2001 |
| TW | 200814795 | 3/2008 |
| TW | M328592 | 3/2008 |
| TW | 201020677 | 6/2010 |

OTHER PUBLICATIONS

"Search Report of Europe Counterpart Application", issued on Jan. 4, 2024, p. 1-p. 8.
"Office Action of Taiwan Counterpart Application", issued on Sep. 6, 2024, p. 1-p. 6.
"Office Action of China Counterpart Application", issued on Apr. 3, 2026, p. 1-p. 14.

* cited by examiner

ILLUMINATION SYSTEM AND PROJECTION DEVICE

CROSS-REFERENCE TO RELATED APPLICATION

This application claims the priority benefit of China application serial no. 202210930829.6 filed on Aug. 4, 2022. The entirety of the above-mentioned patent application is hereby incorporated by reference herein and made a part of this specification.

BACKGROUND

Technical Field

The disclosure relates to an optical system and an optical device, and more particularly, to an illumination system and a projection device.

Description of Related Art

The light sources disposed in projectors have been gradually replaced by laser diode (LD) light sources from ultra-high power (UHP) lamps and red, green, and blue light-emitting diodes (RGB LEDs) possessing the requirements of the sales market for brightness, color saturation, service life, non-toxicity and environmental protection, etc. In order to consider the cost and miniaturize the system, the size of the projector is reduced. At the same time, the light source also gradually adopts the packaged miniaturized light source, especially the miniaturization of the laser light source. However, with the reducing volume of optical elements, the issue of system positioning tolerance begins to become prominent, but the use of precision machining processes increases the product cost.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides an illumination system and a projection device using the illumination system, wherein the illumination system compensates for the issue of positioning tolerance via optical design.

Other objects and advantages of the invention may be further understood from the technical features disclosed in the disclosure.

To achieve one or some or all of the above objects or for other objects, an embodiment of the disclosure provides an illumination system including a light source module, a light splitting and combining element, a beam expanding and collimating module, a reflecting element, and a light combining module. The illumination system is configured to provide an illumination beam. The light source module is configured to emit a first color beam, a second color beam, and a third color beam. The light splitting and combining element and the beam expanding and collimating module are disposed on transmission paths of the first color beam and the second color beam emitted from the light source module and located between the light source module and the light combining module. After the first color beam and the second color beam are transmitted to the light splitting and combining element, the first color beam and the second color beam are reflected by the light splitting and combining element. The transmission paths of the first color beam and the second color beam leaving the light splitting and combining element are coincident. The first color beam and the second color beam from the light splitting and combining element are expanded and collimated by the beam expanding and collimating module and transmitted to the light combining module. The reflecting element is disposed on a transmission path of the third color beam from the light source module and located between the light source module and the light combining module. The third color beam from the light source module is reflected by the reflecting element and transmitted to the light combining module. The transmission paths of the first color beam, the second color beam, and the third color beam after leaving the light combining module are coincident. The illumination beam includes at least one of the first color beam, the second color beam, and the third color beam.

In order to achieve one or a portion or all of the above or other objects, an embodiment of the invention further provides a projection device including the illumination system above, a light valve, and a projection lens. The illumination system includes a light source module, a light splitting and combining element, a reflecting element, a beam expanding and collimating module, and a light combining module. The illumination system is configured to provide an illumination beam. The light valve is disposed on a transmission path of the illumination beam and configured to convert the illumination beam into an image beam. The projection lens is disposed on a transmission path of the image beam to project the image beam out of the projection device. The light source module is configured to generate a first color beam, a second color beam, and a third color beam. The light splitting and combining element and the beam expanding and collimating module are disposed on the transmission path of the first color beam and the second color beam from the light source module and located between the light source module and the light combining module. After the first color beam and the second color beam are transmitted to the light splitting and combining element, the first color beam and the second color beam are reflected by the light splitting and combining element. The transmission paths of the first color beam and the second color beam leaving the light splitting and combining element are coincident. The first color beam and the second color beam from the light splitting and combining element are expanded and collimated by the beam expanding and collimating module and transmitted to the light combining module. The reflecting element is disposed on a transmission path of the third color beam from the light source module and located between the light source module and the light combining module. The third color beam from the light source module is reflected by the reflecting element and transmitted to the light combining module. The transmission paths of the first color beam, the second color beam and the third color beam after leaving the light combining module are coincident. The illumination beam includes at least one of the first color beam, the second color beam, and the third color beam.

Based on the above, in an embodiment of the invention, since the illumination system or the projection device is configured with the beam expanding and collimating module on the transmission paths of the first color beam and the second color beam, the first color beam and the second color beam are expanded and collimated. Therefore, the optical efficiency of the first color beam and the second color beam is improved, the influence of the mechanism tolerance of the system on the optical path is reduced, and the yield of the product is improved.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
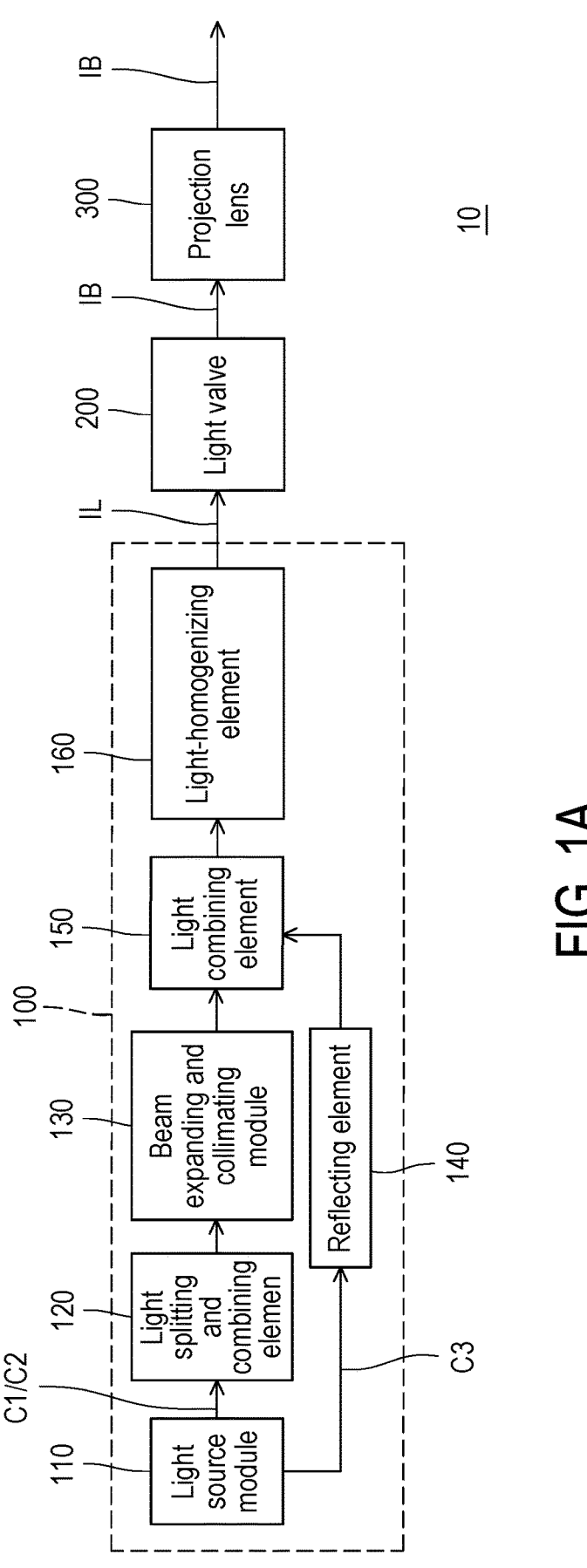
FIG. 1A is a schematic diagram of a projection device according to an embodiment of the disclosure.

FIG. 1A is a schematic diagram of a projection device according to an embodiment of the disclosure. Referring to FIG. 1A, an embodiment of the disclosure provides a projection device 10 including an illumination system 100, a light valve 200, and a projection lens 300. The illumination system 100 includes a light source module 110, a light splitting and combining element 120, a reflecting element 140, a beam expanding and collimating module 130, and a light combining module 150. The illumination system 100 is configured to provide an illumination beam IL. The light valve 200 is disposed on the transmission path of the illumination beam IL to convert the illumination beam IL into an image beam IB. The projection lens 300 is disposed on the transmission path of the image beam IB to project the image beam IB out of the projection device 10 to generate a projection image (not shown).

Specifically, in the present embodiment, the light valve 200 of the present embodiment is, for example, a spatial light modulator such as a digital micro-minor device (DMD), a liquid-crystal-on-silicon (LCOS) panel, or a liquid-crystal panel. In addition, the projection lens 300 is, for example, a combination including one or a plurality of optical lenses having a diopter. The optical lens includes, for example, various combinations of non-planar lenses such as a bi-concave lens, a bi-convex lens, a concave-convex lens, a convex-concave lens, a plano-convex lens, and a plano-concave lens. The invention does not limit the configuration and the type of the projection lens 300.

Figure 1B:
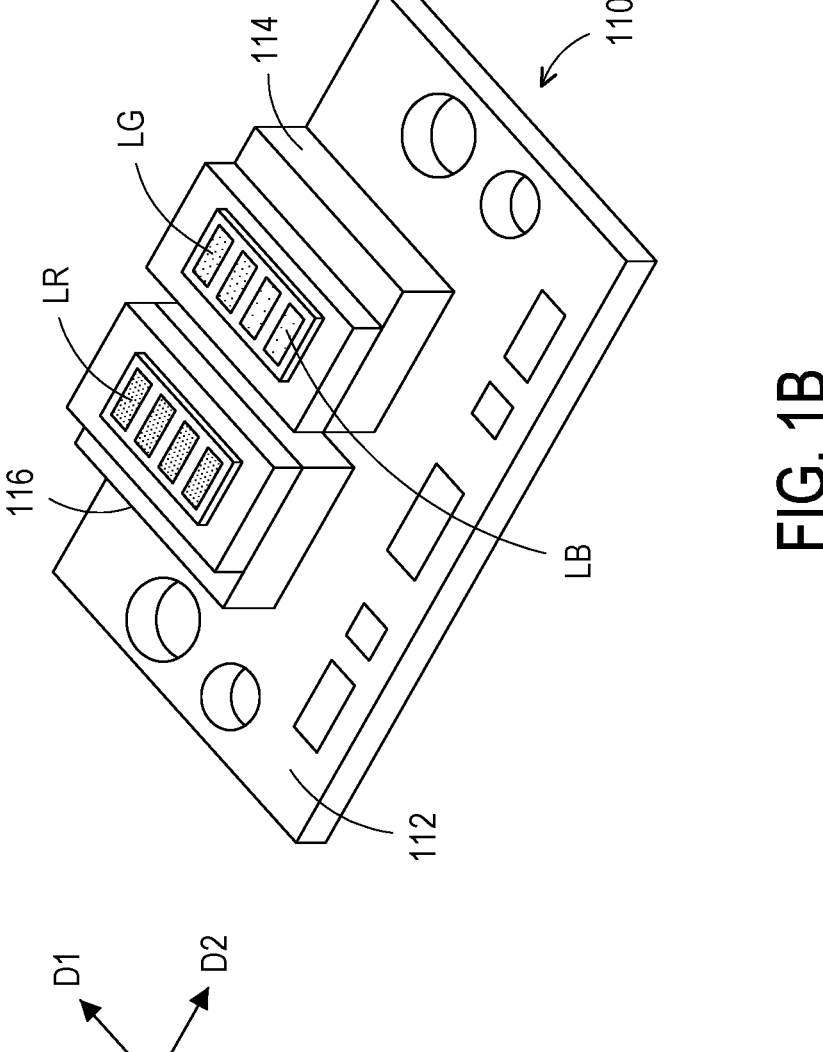
FIG. 1B is a schematic diagram of the light source module in FIG. 1A.
Figure 2A:
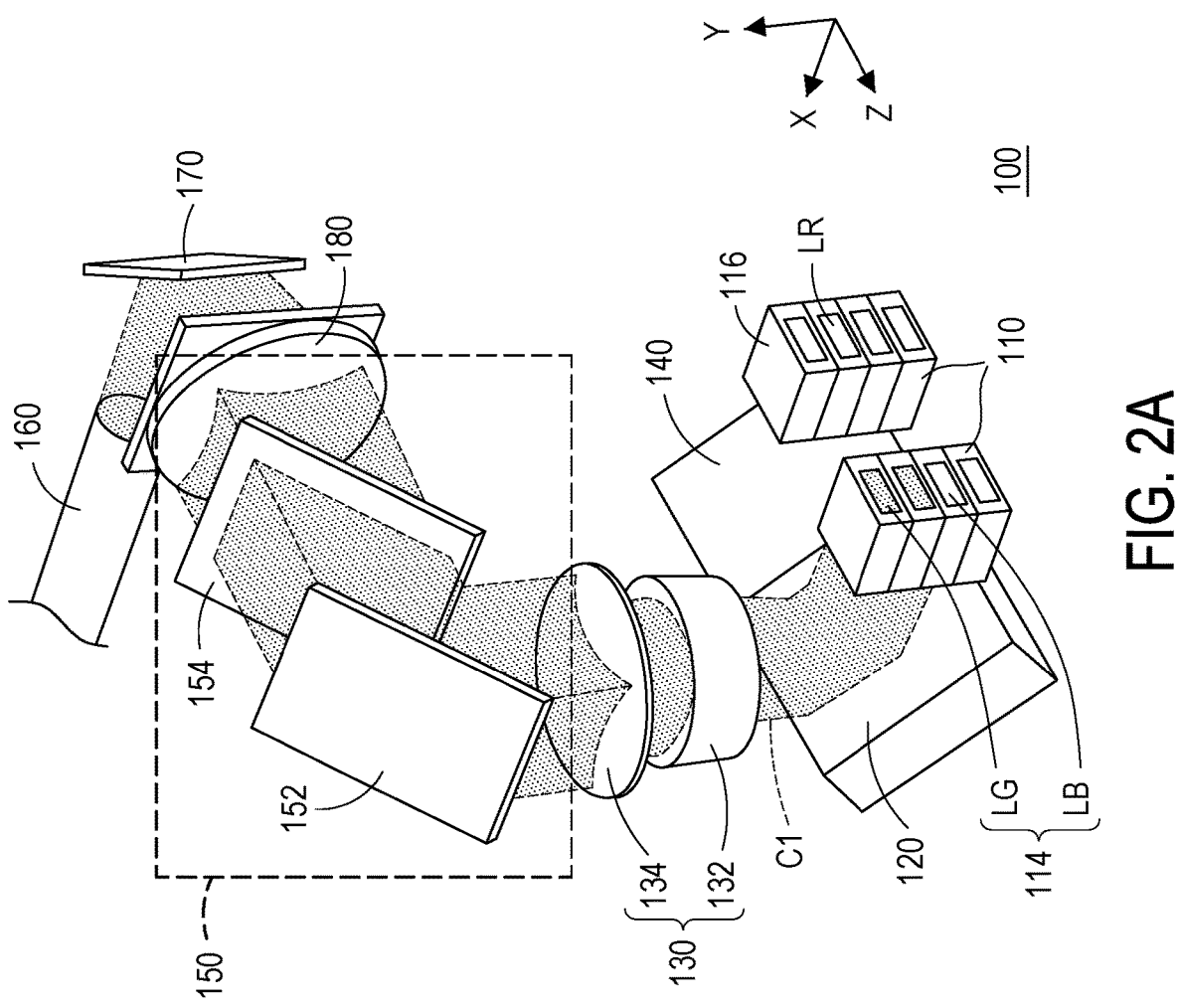
FIG. 2A is a schematic diagram of the transmission path of the first color beam of the illumination system in FIG. 1A.
Figure 2B:
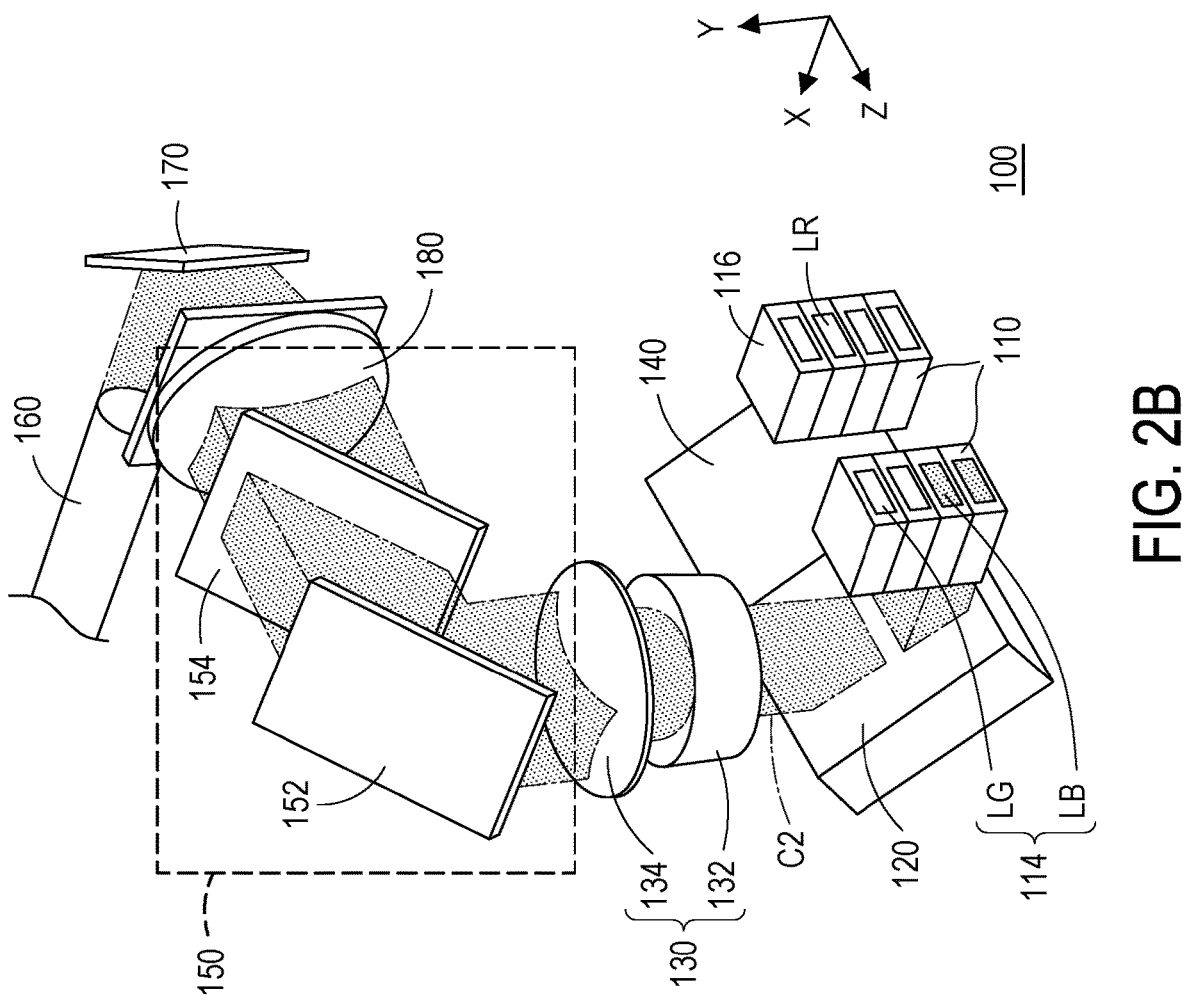
FIG. 2B is a schematic diagram of the transmission path of the second color beam of the illumination system in FIG. 1A.
Figure 2C:
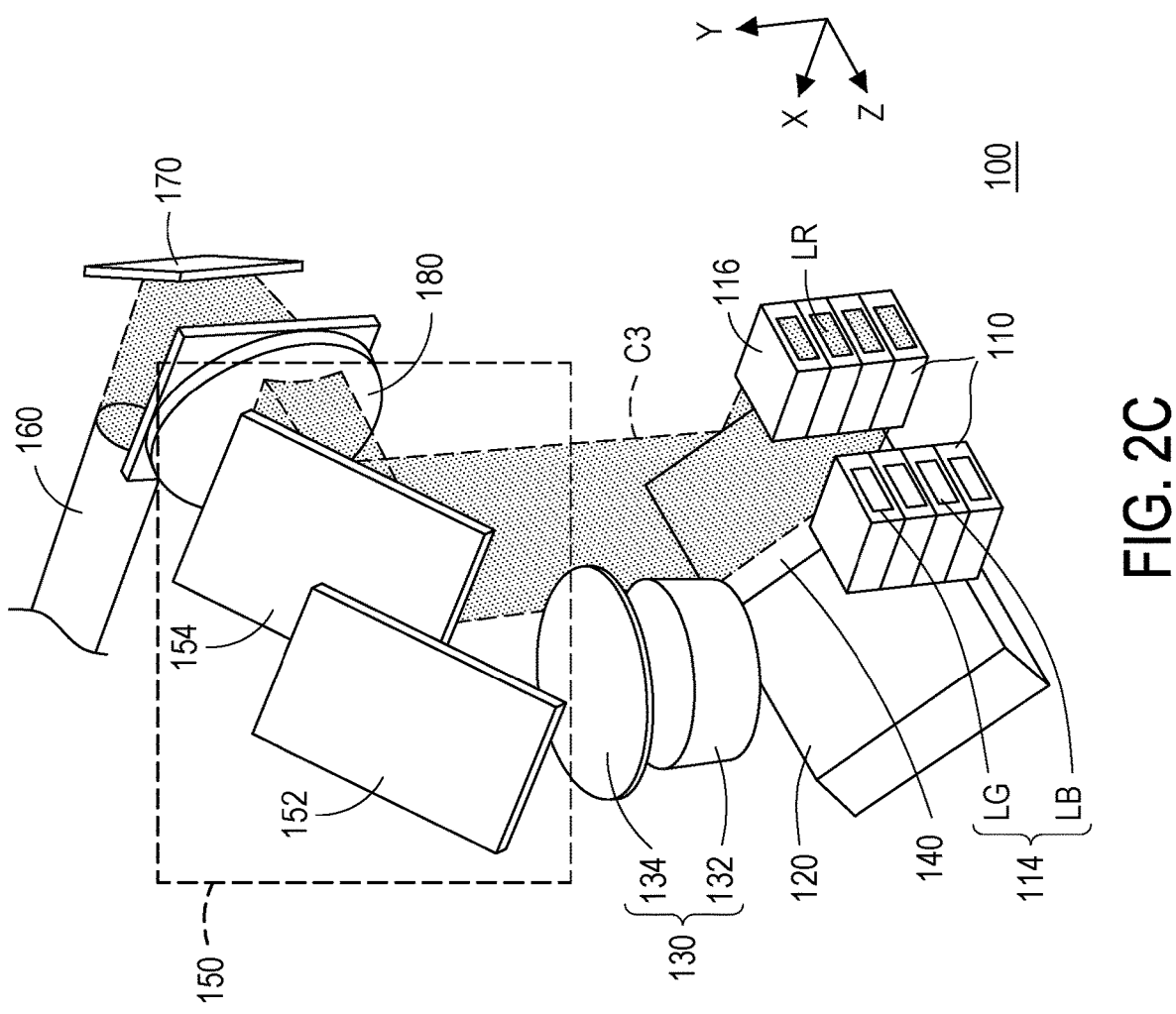
FIG. 2C is a schematic diagram of the transmission path of the third color beam of the illumination system in FIG. 1A.
Figure 2D:
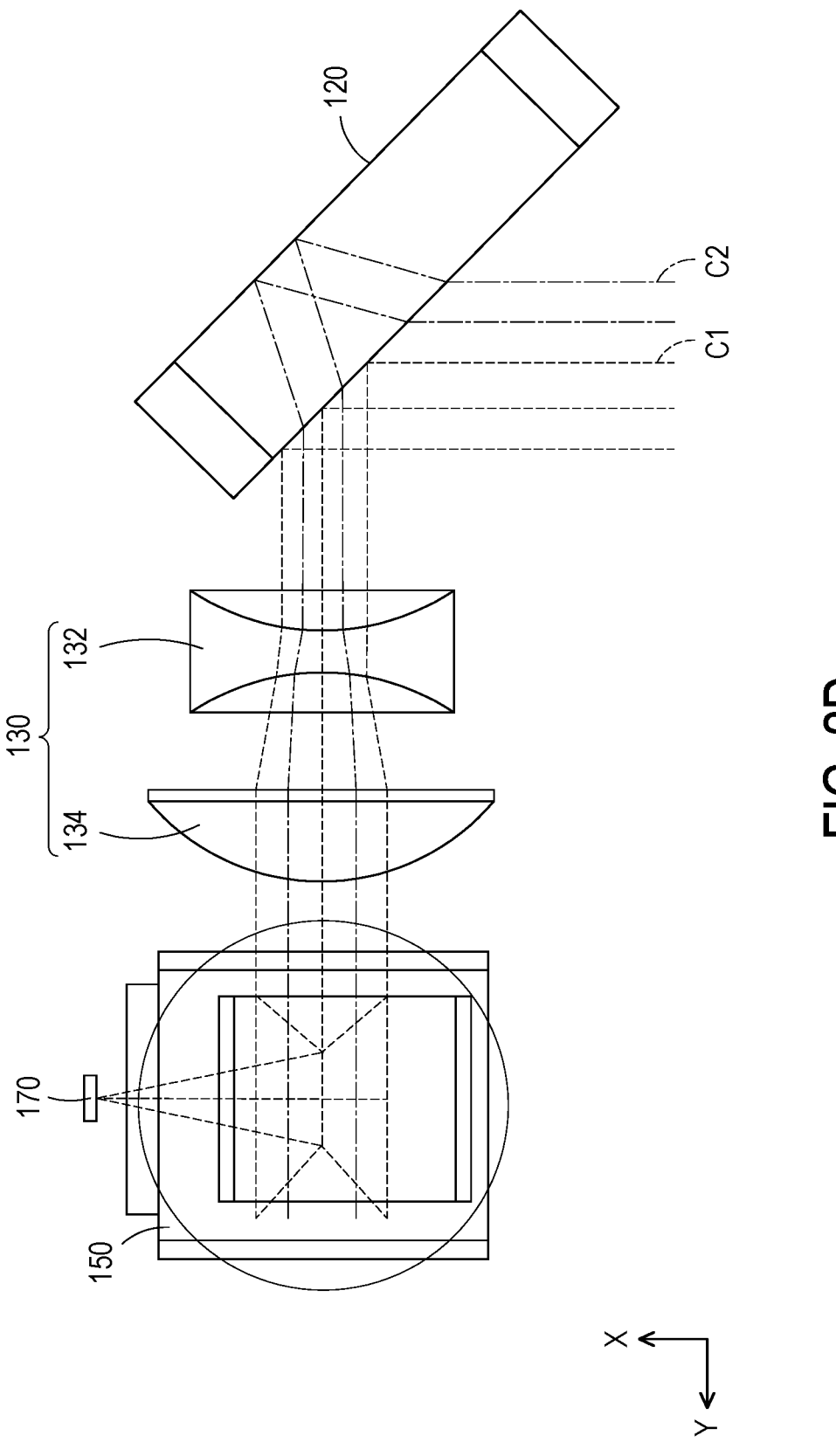
FIG. 2D is a schematic diagram of the transmission paths of the first color beam and the second color beam at the light splitting and combining element in FIG. 1A.
Figure 2E:
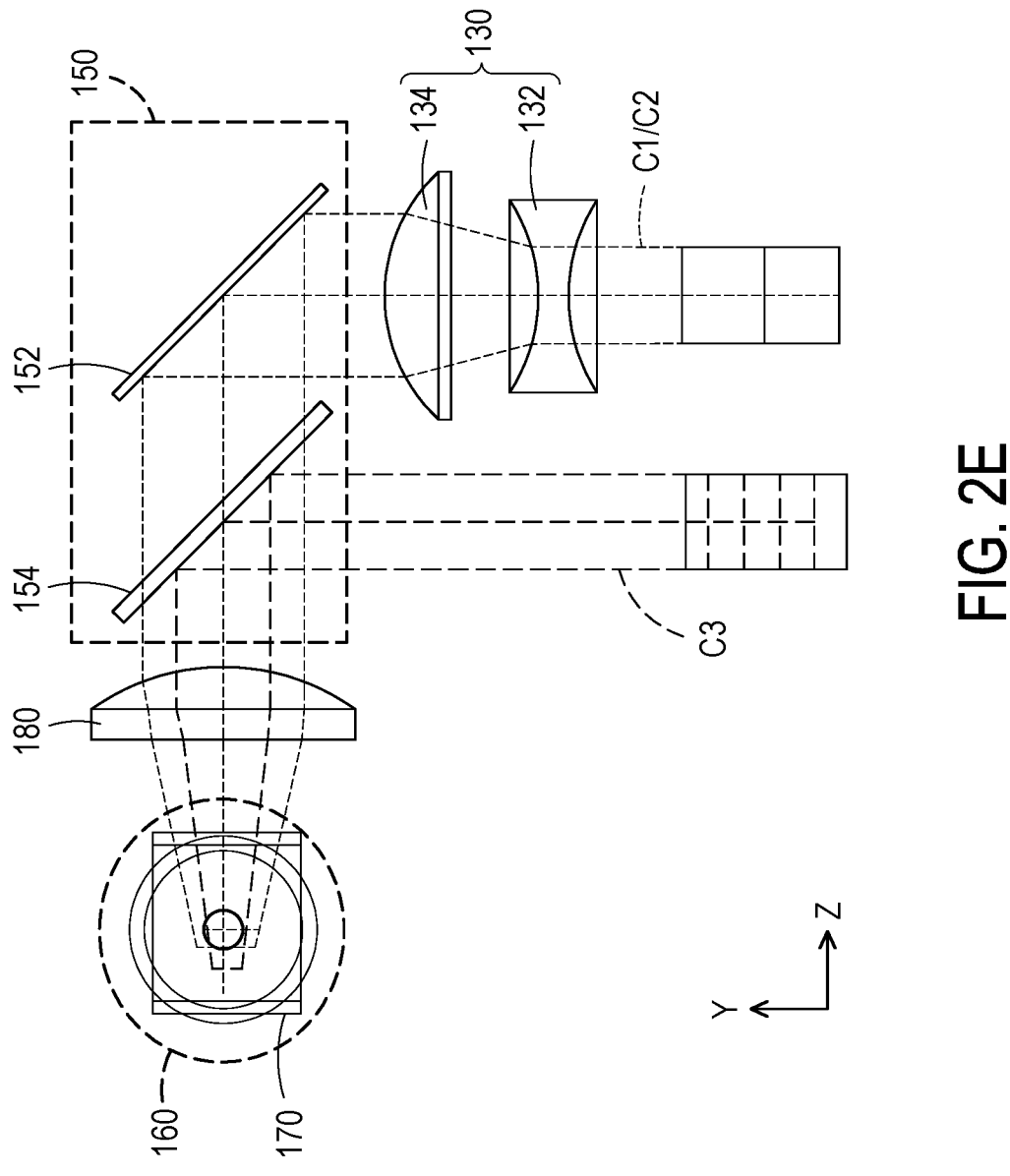
FIG. 2E is a schematic diagram of the transmission paths of the first color beam, the second color beam, and the third color beam at the light combining module in FIG. 1A.

FIG. 1B is a schematic diagram of the light source module in FIG. 1A. FIG. 2A is a schematic diagram of the optical path of the first color beam of the illumination system in FIG. 1A. FIG. 2B is a schematic diagram of the transmission path of the second color beam of the illumination system in FIG. 1A. FIG. 2C is a schematic diagram of the transmission path of the third color beam of the illumination system in FIG. 1A. FIG. 2D is a schematic diagram of the transmission paths of the first color beam and the second color beam at the light splitting and combining element in FIG. 1A. FIG. 2E is a schematic diagram of transmission paths of the first color beam, the second color beam, and the third color beam at the light combining module in FIG. 1A. In particular, a substrate 112 is omitted from the light source module 110 in FIG. 2A, FIG. 2B, and FIG. 2C. FIG. 2D shows a schematic diagram of the light splitting and combining element and the beam expanding and collimating module on the XY plane, and FIG. 2E shows a schematic diagram of the light splitting and combining element and the beam expanding and collimating module on the YZ plane.

Please refer to FIG. 1A to FIG. 2E at the same time. In the present embodiment, the light source module 110 may be a laser diode module, such as a laser diode array. The light source module 110 is configured to generate a first color beam C1, a second color beam C2, and a third color beam C3. In particular, the first color beam C1, the second color beam C2, and the third color beam C3 may be green, blue, and red beams, respectively, but the invention is not limited thereto. Referring to FIG. 1B, the light source module 110 in the present embodiment includes the substrate 112, a first light source unit 114, and a second light source unit 116, wherein the first light source unit 114 and the second light source unit 116 are disposed at the substrate 112, and there is a gap between the first light source unit 114 and the second light source unit 116, the first light source unit 114 includes a green laser diode LG and a blue laser diode LB to respectively provide the first color beam C1 (green light) and the second color beam C2 (blue light), and the first light source unit 114 is not configured with the red laser diode LR. The second light source unit 116 includes the red laser diode LR to provide the third color beam C3, and the second light source unit 116 is not configured with the blue laser diode LB and the green laser diode LG. In particular, the number of the green laser diode LG and the blue laser diode LB of the first light source unit 114 may be one or a plurality, and the number of the green laser diode LG may be the same as or different from the number of the blue laser diode LB, the number of the red laser diode LR of the second light source unit 116 may be one or a plurality, and the number of the red laser diode LR may be the same as or different from the number of the green laser diode LG and the number of the blue laser diode LB. In the embodiment of the light source module 110 shown in FIG. 1B, the number of the green laser diodes LG of the first light source unit 114 is two. The number of the blue laser diodes LB of the first light source unit 114 is two. The two green laser diodes LG and the two blue laser diodes LB are sequentially arranged along a first direction D1. The number of the red laser diodes LR of the second light source unit 116 is four. The four red laser diodes LR are sequentially arranged along the first direction D1. The second light source unit 116 and the first light source unit 114 are arranged along a second direction D2. The first direction D1 is perpendicular to the second direction D2, wherein the first direction D1 is, for example, parallel to a Y axis, and the second direction D2 is parallel to a Z axis. In other embodiment of the light source module, the number of the green laser diodes LG of the first light source unit 114 is three. The number of the blue laser diodes LB of the first light source unit 114 is two. The three green laser diodes LG and the two blue laser diodes LB are sequentially arranged along a first direction D1. The number of the red laser diodes LR of the second light source unit 116 is four. The four red laser diodes LR are sequentially arranged along the first direction D1.

In the present embodiment shown in FIGS. 1A to 2E, the light splitting and combining element 120 and the beam expanding and collimating module 130 are disposed on the transmission paths of the first color beam C1 and the second color beam C2 from the first light source unit 114 of the light source module 110 and located between the first light source unit 114 of the light source module 110 and the light combining module 150. After the first color beam C1 and the second color beam C2 are transmitted to the light splitting and combining element 120, the first color beam C1 and the second color beam C2 are reflected by the light splitting and combining element 120. The transmission path of the first color beam C1 leaving the light splitting and combining element 120 and the transmission path of the second color beam C2 leaving the light splitting and combining element 120 are coincident. The first color beam C1 and the second color beam C2 from the light splitting and combining element 120 enter the beam expanding and collimating module 130, and then the first color beam C1 and the second color beam C2 are transmitted to the light combining module 150 after being expanded and collimated by the beam expanding and collimating module 130. In the embodiment of FIG. 2A, the first color beam C1 (green light) emitted from the green laser diodes LG of the first light source unit 114 is transmitted to the light splitting and combining element 120 along a direction of X axis. In the embodiment of FIG. 2B, the second color beam C2 (blue light) emitted from the blue laser diodes LB of the first light source unit 114 is transmitted to the light splitting and combining element 120 along the direction of X axis. In the embodiment of FIG. 2D, the first color beam C1 and the second color beam C2 from the light splitting and combining element 120 are transmitted to the beam expanding and collimating module 130 along the direction of the Y axis.

Figure 3:
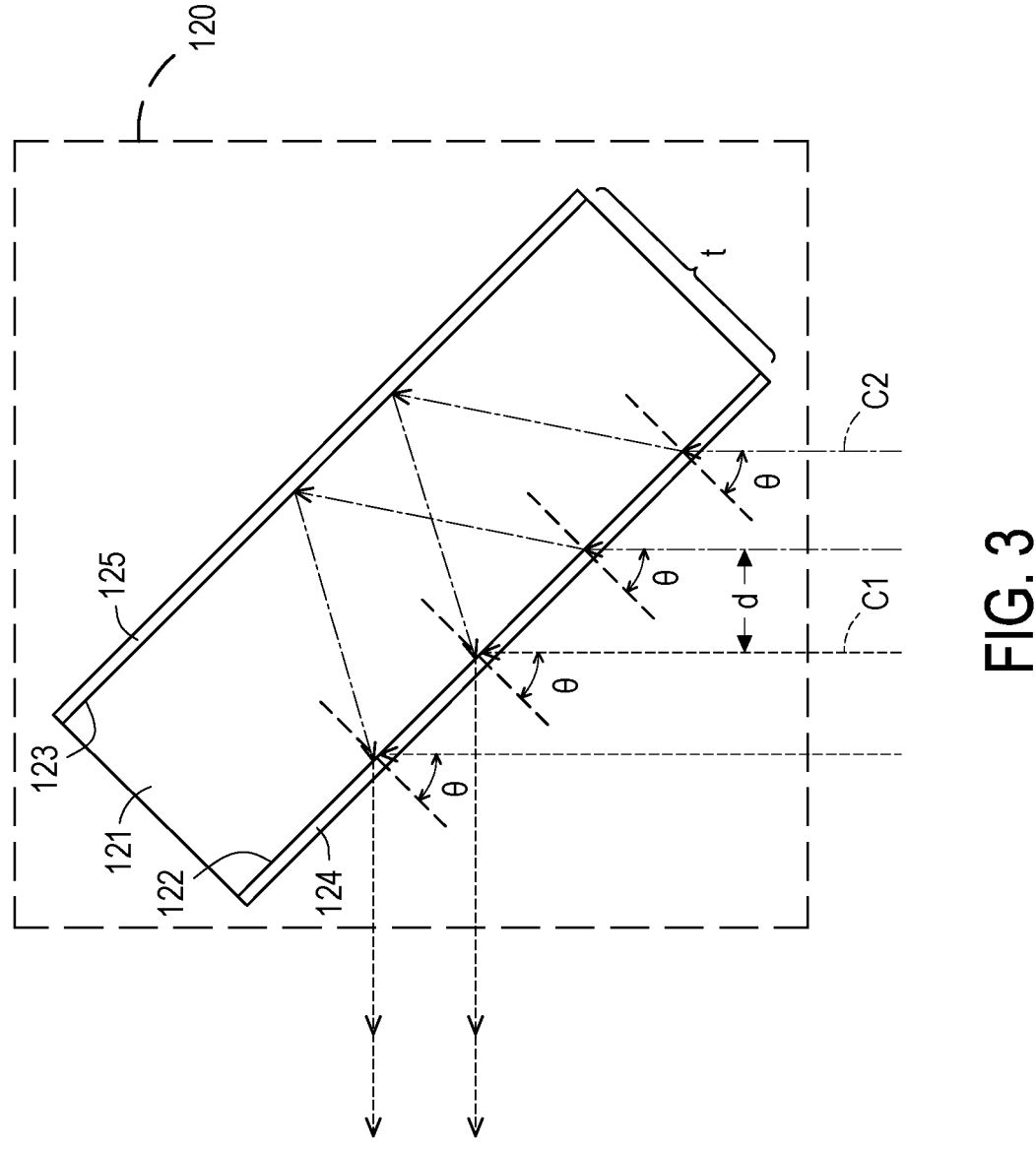
FIG. 3 is a schematic diagram of a light splitting and combining element according to the first embodiment of the disclosure.

FIG. 3 is a schematic diagram of a light splitting and combining element according to the first embodiment of the disclosure. Referring to FIG. 3, in the present embodiment, the light splitting element 120 includes a light pervious substrate 121, a first light transmissive element 124, and a second light transmissive element 125. The light pervious substrate 121 has a first optical surface 122 and a second optical surface 123, the first optical surface 122 faces the light source module 110, and the first optical surface 122 and the second optical surface 123 are surfaces on two opposite sides of the light pervious substrate 121, respectively. The first light transmissive element 124 is disposed on the first optical surface 122 of the light pervious substrate 121. The second light transmissive element 125 is disposed on the second optical surface 123 of the light pervious substrate 121. The material of the light pervious substrate 121 may be glass or other light pervious materials, and the disclosure is not limited thereto. The material of the first light transmissive element 124 and the second light transmissive element 125 may be titanium dioxide ($TiO_2$) or silicon dioxide ($SiO_2$) or other suitable materials. In an embodiment, the material of the first light transmissive element 124 and the material of the second light transmissive element 125 are different or/and the thickness of the first light transmissive element 124 and the thickness of the second light transmissive element 125 are different. Therein, the term "light transmissive element" is defined as an element that may provide an effect of reflecting a beam or allowing the beam to pass through so as to transmit the beam to a subsequent optical element. The first light transmissive element 124 is, for example, a dielectric layer coating having a light splitting function attached to the light pervious substrate 121, and has selectivity for beams of different wavelengths. Therefore, different light transmissive effects (reflection or penetration) may be provided for the first color beam C1 and the second color beam C2 with different wavelengths to obtain a light splitting effect; the second light transmissive element 125 is, for example, a dielectric layer coating having a light-splitting function attached to the light pervious substrate 121, or a reflecting layer (ex. reflecting minor) formed by a metal coating attached to the light pervious substrate 121 to provide a reflection effect to the second color beam C2, or to provide a reflection effect to a small portion of the first color beam C1 passing through the first light transmissive element 124. Moreover, when the first light transmissive element 124 or the second light transmissive element 125 is a dielectric layer coating, the light splitting effect may be obtained by designing the materials or thicknesses of the first light transmissive element 124 and the second light transmissive element 125 to be different.

In the present embodiment, the first light transmissive element 124 is designed to reflect green light and allow blue light to pass through, and the second light transmissive element 125 is designed to reflect blue light. The first color beam C1 incident on the light splitting and combining element 120 is reflected by the first light transmissive element 124 and leaves the light splitting and combining element 120. The second color beam C2 incident on the light splitting and combining element 120 passes through the first light transmissive element 124 and the light pervious substrate 121 in sequence, and then the second color beam C2 is reflected by the second light transmissive element 125. The second color beam C2 reflected by the second light transmissive element 125 passes through the light pervious substrate 121 and the first light transmissive element 124 and leaves the light splitting and combining element 120. The transmission paths of the first color beam C1 and the second color beam C2 leaving the light splitting and combining element 120 are coincident.

Moreover, in other embodiments, the first light transmissive element 124 may also be designed to reflect blue light and allow green light to pass through, and the second light transmissive element 125 may be designed to reflect green light. That is, the first color beam C1 may be a blue beam, and the second color beam C2 may be a green beam.

In the present embodiment, the transmission paths of the first color beam C1 and the second color beam C2 from the light source module 110 to the light splitting element 120 are parallel to each other, but are not coincident, and the transmission paths of the first color beam C1 and the second color beam C2 leaving the light splitting and combining element 120 are coincident.

In the present embodiment, when the first color beam C1 is incident on the light splitting and combining element 120, there is an included angle θ between the first color beam C1 and the normal of the first optical surface 122 of the light pervious substrate 121, and the included angle θ is substantially in the range of 30 degrees to 75 degrees. Considering a thickness t of the light pervious substrate 121 and the volume of the light splitting and combining element 120, the included angle θ is substantially in the range of 30 degrees to 60 degrees. According to some embodiments, the included angle θ is substantially 45 degrees.

In the present embodiment, the first optical surface 122 is parallel to the second optical surface 123. The distance between the first color beam C1 and the second color beam C2 is d, the refractive index of the light pervious substrate 121 is n, the included angle between the first color beam C1 and the normal of the first optical surface C2 is θ, the thickness of the light pervious substrate 121 is t, and $$t = \frac{\sqrt{n^2 - \sin^2\theta}}{\sin 2\theta} \times d.$$

In some embodiments, the geometric centers of the light spots generated when the first color beam C1 and the second color beam C2 leave the light splitting and combining element 120 are coincident. As shown in FIG. 3, the distance d between the first color beam C1 and the second color beam C2 is a distance between an optical axis of the first color beam C1 incident on the first light transmissive element 124 and an optical axis of the second color beam C2 incident on the first light transmissive element 124.

Please refer to FIG. 1A to FIG. 2E again. In the present embodiment, the beam expanding and collimating module 130 includes a spherical concave lens 132 and a spherical convex lens 134. The spherical concave lens 132 is located between the light splitting and combining element 120 and the spherical convex lens 134. The illumination system of the present embodiment may compensate for the issue of positioning tolerance between optical elements via the disposition of the beam expanding and collimating module 130.

In the present embodiment, the light splitting element 120 and the beam expanding and collimating module 130 are not located on the transmission path of the third color beam C3, as shown in FIG. 1A or FIG. 2C.

In the present embodiment, as shown in FIG. 2C, the reflecting element 140 is disposed adjacent to the light splitting and combining element 120 and disposed on the transmission path of the third color beam C3 from the light source module 110, and the reflecting element 140 is located between the second light source unit 116 of the light source module 110 and the light combining module 150. Furthermore, the reflecting element 140 and the light splitting and combining element 120 are disposed adjacent to each other along Z axis. The third color beam C3 from the light source module 110 is reflected by the reflecting element 140 and transmitted to the light combining module 150. In particular, as shown in FIG. 2A to FIG. 2C, the transmission paths of the first color beam C1, the second color beam C2, and the third color beam C3 after leaving the light combining module 150 are coincident. In the embodiment of FIG. 2C, the third color beam C3 (red light) emitted along the direction of X axis from the red laser diodes LR of the second light source unit 116 is transmitted to the reflecting element 140. In the disclosure, any two of X axis, Y axis and Z axis are perpendicular to each other.

In the present embodiment, the light combining module 150 includes a reflecting minor 152 and a dichroic element 154. The reflecting mirror 152 is located on the transmission paths of the first color beam C1 and the second color beam C2 to reflect the first color beam C1 and the second color beam C2 from the beam expanding and collimating module 130 to the dichroic element 154. The dichroic element 154 is located on the transmission paths of the third color beam C3, the first color beam C1, and the second color beam C2. The dichroic element 154 guides the first color beam C1 and the second color beam C2 from the reflecting mirror 152 and the third color beam C3 from the reflecting element 140 to transmit in the same direction, for example, a direction of −Z axis. More specifically, in the present embodiment, the dichroic element 154 is, for example, a dichroic mirror reflecting red light and allowing blue light and green light to pass through. Therefore, the first color beam C1 and the second color beam C2 from the reflecting mirror 152 may pass through the dichroic element 154, and the third color beam C3 from the reflecting element 140 may be reflected by the dichroic element 154.

In the present embodiment, the illumination system 100 further includes a light-homogenizing element 160, a reflector 170, and a lens 180. The light-homogenizing element 160 is disposed between the light combining module 150 and the light valve 200 (shown in FIG. 1A). In particular, the light-homogenizing element 160 is, for example, an integration rod, a lens array, or other optical elements having a light-homogenizing effect. In the present embodiment, the light-homogenizing element 160 is an integration rod, and the reflector 170 is disposed between the light-homogenizing element 160 and the light combining module 150. The lens 180 is disposed between the reflector 170 and the light combining module 150. The first color beam C1, the second color beam C2, and the third color beam C3 from the light combining module 150 are focused by the lens 180 and reflected by the reflector 170 to be incident on the light-homogenizing element 160.

In the present embodiment, the illumination beam IL emitted from the light-homogenizing element 160 includes at least one of the first color beam C1, the second color beam C2, and the third color beam C3.

Based on the above, in an embodiment of the invention, the illumination system 100 of the projection device 10 utilizes the light splitting element 120 to make the paths of the first color beam C1 and the second color beam C2 after leaving the light splitting element 120 coincident. Furthermore, the beam expanding and collimating module 130 is disposed on the transmission paths of the first color beam C1 and the second color beam C2 to expand and collimate the first color beam C1 and the second color beam C2. Therefore, the optical efficiency of the first color beam C1 and the second color beam C2 is improved, so that the influence of the mechanism tolerance of the system on the optical path is reduced, thus improving the yield of the product. Moreover, via the above design, the illumination system 100 may make the first color beam C1, the second color beam C2, and the third color beam C3 entering the light-homogenizing element 160 symmetrical in both object space and angular space. Therefore, the overall uniformity of the projection device 10 may be effectively provided.

In addition, by adjusting the refractive index n of the light pervious substrate 121, the distance d between the first color beam C1 and the second color beam C2, the included angle θ between the first color beam C1 and the normal of the first optical surface 122, or the thickness t of the light pervious substrate 121, the illumination system 100 or the projection device 10 of an embodiment of the invention satisfies $$t = \frac{\sqrt{n^2 - \sin^2\theta}}{\sin 2\theta} \times d,$$

so that the paths of the first color beam C1 and the second color beam C2 leaving the light pervious substrate 121 are coincident. Therefore, the color uniformity when the illumination system 100 or the projection device 10 emits light is improved.

Figure 4:
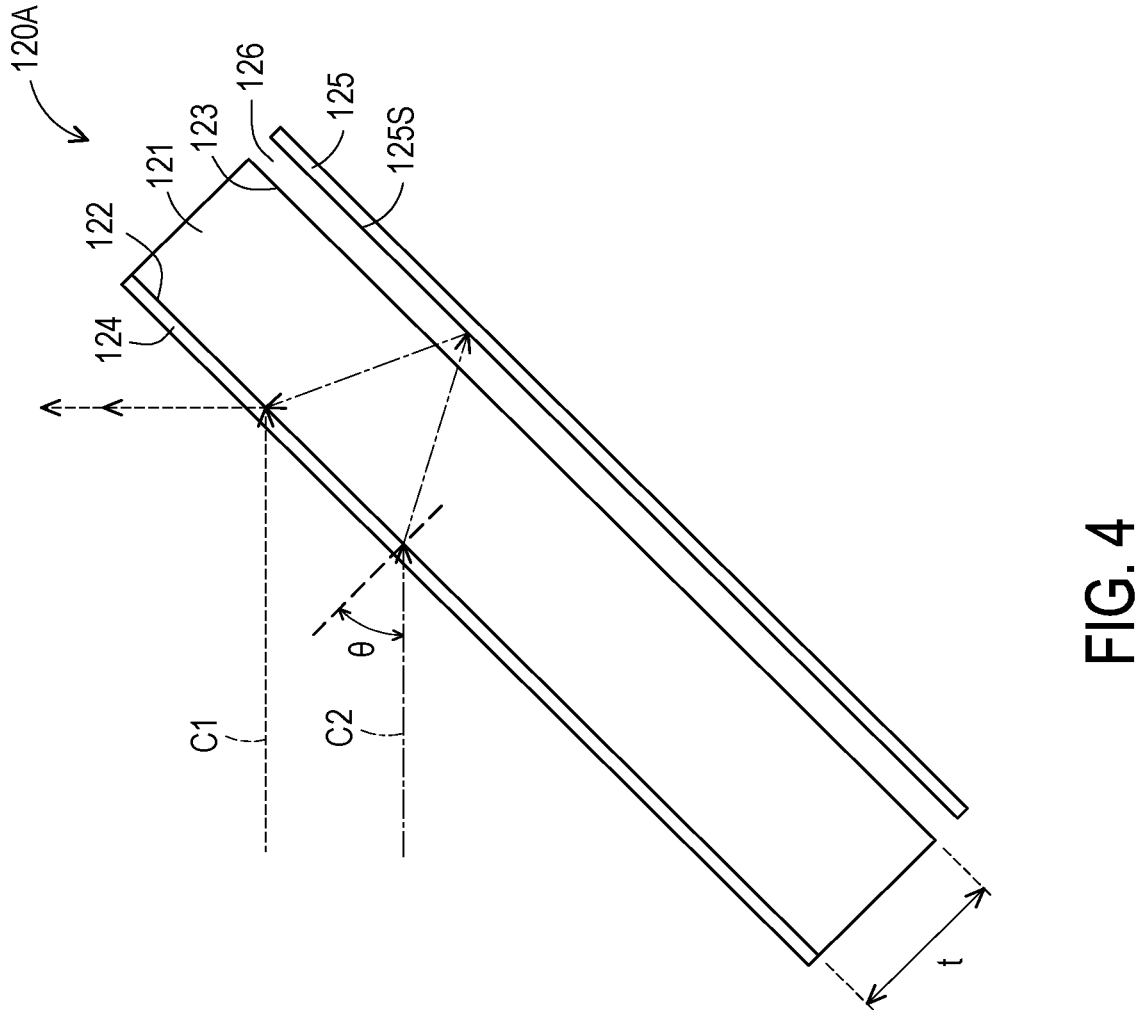
FIG. 4 is a schematic diagram of a light splitting and combining element according to the second embodiment of the disclosure.

FIG. 4 is a schematic diagram of a light splitting and combining element according to the second embodiment of the disclosure. Referring to FIG. 4, a light splitting and combining element 120A of FIG. 4 is substantially similar to the light splitting and combining element 120 of FIG. 3, and the main difference thereof is: the second light transmissive element 125 is not directly disposed on the second optical surface 123 of the light pervious substrate 121 (no gap between the second light transmissive element 125 and the light pervious substrate 121 of FIG. 3), instead there is a gap between the second light transmissive element 125 and the light pervious substrate 121, i.e., the air gap 126. According to some embodiments, a thickness of the air gap 126 is about greater than 0 mm and less than or equal to 2 mm, but is not limited thereto. The thickness of the air gap 126 is a distance between the second light transmissive element 125 and the light pervious substrate 121 along an arrangement direction of the first light transmissive element 124, the light pervious substrate 121 and the second light transmissive element 125. In the embodiment of FIG. 4, the first light transmissive element 124 is a coating, such as a dielectric layer coating having a light splitting function. In the embodiment of FIG. 4, the second light transmissive element 125 is an adjustable flat mirror to provide a reflection effect to the second color beam C2 penetrating the light pervious substrate 121. According to some embodiments, the second light transmissive element 125 is substantially parallel to the second optical surface 123. According to some embodiments, the material of the first light transmissive element 124 is not the same as the material of the second light transmissive element 125. According to some embodiments, the thickness of the first light transmissive element 124 is not the same as the thickness of the second light transmissive element 125. The advantages of applying the light splitting element 120A to the illumination system 100 or the projection device 10 of FIG. 1 are similar to those of the light splitting and combining element 120 of FIG. 3, and are not repeated herein.

Figure 5:
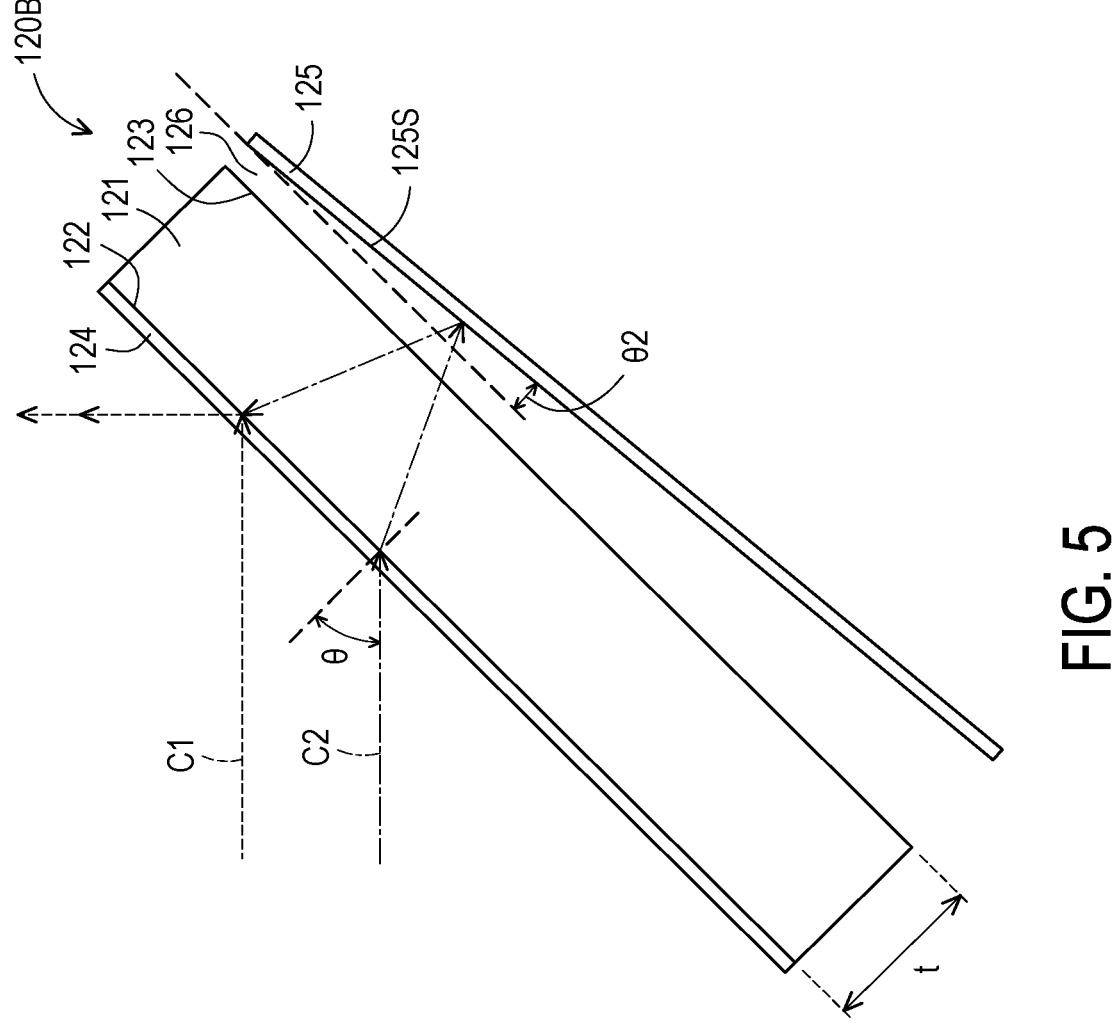
FIG. 5 is a schematic diagram of a light splitting and combining element according to the third embodiment of the disclosure.

FIG. 5 is a schematic diagram of a light splitting and combining element according to the third embodiment of the disclosure. Referring to FIG. 5, a light splitting and combining element 120B of FIG. 5 is substantially similar to the light splitting and combining element 120A of FIG. 4, and the main difference thereof is that in the present embodiment, there is a relative included angle θ2 between the second light transmissive element 125 and the second optical surface 123 of the light pervious substrate 121, the relative included angle θ2 is an adjustable angle, and the relative included angle θ2 is −1 degree to 1 degree. According to some other embodiments, the range of the relative included angle θ2 is −0.5 degrees to 0.5 degrees. As shown in FIG. 5, by adjusting the relative included angle θ2 of the second light transmissive element 125 and the second optical surface 123, the transmission path of the second color beam C2 reflected by the reflecting surface 125S of the second light transmissive element 125 when leaving the light splitting and combining element 120B may be coincident with the transmission path of the first color beam C1 when leaving the light splitting and combining element 120B. The advantages of applying the light splitting and combining element 120B to the illumination system 100 of the projection device 10 of FIG. 1 are similar to those of the light splitting and combining element 120A of FIG. 4, and are not repeated herein.

Based on the above, in an embodiment of the disclosure, the illumination system or the projection device uses the light splitting and combining element to make the transmission paths of the first color beam and the second color beam after leaving the light splitting and combining element coincident. Furthermore, the beam expanding and collimating module is disposed on the transmission paths of the first color beam and the second color beam to expand and collimate the first color beam and the second color beam. Therefore, the optical efficiency of the first color beam and the second color beam is improved, so that the influence of the mechanism tolerance of the system on the optical path is reduced, thus improving the yield of the product.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the invention does not imply a limitation on the invention, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. An illumination system, comprising a light source module, a light splitting and combining element, a beam expanding and collimating module, a reflecting element, and a light combining module, and the illumination system is configured to provide an illumination beam, wherein:

the light source module is configured to emit a first color beam, a second color beam, and a third color beam;

the light splitting element and the beam expanding and collimating module are disposed on transmission paths of the first color beam and the second color beam from the light source module and located between the light source module and the light combining module, and after the first color beam and the second color beam are transmitted to the light splitting and combining element, the first color beam and the second color beam are reflected by the light splitting and combining element, wherein the transmission paths of the first color beam and the second color beam leaving the light splitting element are coincident, and the first color beam and the second color beam from the light splitting and combining element are expanded and collimated by the beam expanding and collimating module and transmitted to the light combining module;

the reflecting element is disposed on a transmission path of the third color beam from the light source module and located between the light source module and the light combining module, and the third color beam from the light source module is reflected by the reflecting element and transmitted to the light combining module, wherein the light splitting and combining element and the beam expanding and collimating module are not located on the transmission path of the third color beam; and the transmission paths of the first color beam, the second color beam, and the third color beam after leaving the light combining module are coincident, and the illumination beam comprises at least one of the first color beam, the second color beam, and the third color beam.

2. The illumination system of claim 1, wherein the beam expanding and collimating module comprises a spherical concave lens and a spherical convex lens, and the spherical concave lens is located between the light splitting and combining element and the spherical convex lens.

3. The illumination system of claim 1, wherein the light splitting and combining element comprises a light pervious substrate, a first light transmissive element, and a second light transmissive element, wherein:

the light pervious substrate has a first optical surface facing the light source module and a second optical surface opposite to the first optical surface;

the first light transmissive element is disposed on the first optical surface;

the second light transmissive element is disposed on the second optical surface;

wherein the first color beam incident on the light pervious substrate is reflected by the first light transmissive element and leaves the light pervious substrate, and after the second color beam incident on the light pervious substrate passes through the first light transmissive element, the second color beam is reflected by the second light transmissive element, and then passes through the first light transmissive element and leaves the light pervious substrate, wherein the transmission paths of the first color beam and the second color beam leaving the light pervious substrate are coincident.

4. The illumination system of claim 3, wherein the transmission paths of the first color beam and the second color beam from the light source module to the light splitting and combining element are parallel to each other.

5. An illumination system, comprising a light source module, a light splitting and combining element, a beam expanding and collimating module, a reflecting element, and a light combining module, and the illumination system is configured to provide an illumination beam, wherein:

the light source module is configured to emit a first color beam, a second color beam, and a third color beam;

the light splitting element and the beam expanding and collimating module are disposed on transmission paths of the first color beam and the second color beam from the light source module and located between the light source module and the light combining module, and after the first color beam and the second color beam are transmitted to the light splitting and combining element, the first color beam and the second color beam are reflected by the light splitting and combining element, wherein the transmission paths of the first color beam and the second color beam leaving the light splitting element are coincident, and the first color beam and the second color beam from the light splitting and combining element are expanded and collimated by the beam expanding and collimating module and transmitted to the light combining module;

the reflecting element is disposed on a transmission path of the third color beam from the light source module and located between the light source module and the light combining module, and the third color beam from the light source module is reflected by the reflecting element and transmitted to the light combining module, wherein the light combining module comprises a reflecting mirror and a dichroic element, the reflecting mirror is located on the transmission paths of the first color beam and the second color beam to reflect the first color beam and the second color beam from the beam expanding and collimating module to the dichroic element, the dichroic element is located on transmission paths of the third color beam, the first color beam, and the second color beam, and the dichroic element guides the first color beam and the second color beam from the reflecting mirror and the third color beam from the reflecting element to be transmitted in a same direction.

6. The illumination system of claim 3, wherein the first optical surface is parallel to the second optical surface, a distance between the first color beam and the second color beam is d, a refractive index of the light pervious substrate is n, an angle between the first color beam and a normal of the first optical surface is θ, a thickness of the light pervious substrate is t, and $$t = \frac{\sqrt{n^2 - \sin^2\theta}}{\sin 2\theta} \times d.$$

7. The illumination system of claim 3, wherein a material of the first light transmissive element is different from a material of the second light transmissive element or/and a thickness of the first light transmissive element is different from a thickness of the second light transmissive element.

8. The illumination system of claim 3, wherein there is an air gap between the second light transmissive element and the light pervious substrate.

9. The illumination system of claim 3, wherein a relative included angle between the second light transmissive element and the second optical surface is adjustable, and the relative included angle is −1 degree to 1 degree.

10. The illumination system of claim 3, wherein there is an included angle between the first color beam and a normal of the first optical surface of the light pervious substrate, and the included angle is substantially in a range of 30 degrees to 60 degrees.

11. The illumination system of claim 1, wherein the light source module comprises a substrate, a first light source unit and a second light source unit, the first light source unit and the second light source unit are disposed at an interval on the substrate, wherein the first light source unit comprises two green laser diodes and blue laser diodes for respectively generating the first color light beam and the second color light beam, and the second light source unit comprises four red laser diodes for generating the third color light beam.

12. The illumination system of claim 11, wherein the two green laser diodes and the two blue laser diodes are sequentially arranged along a first direction, the four red laser diodes are sequentially arranged along the first direction, and the second light source unit and the first light source unit are arranged on the substrate along a second direction, wherein the first direction is perpendicular to the second direction.

13. A projection device, comprising an illumination system, a light valve, and a projection lens, wherein the illumination system comprises a light source module, a light splitting and combining element, a reflecting element, a beam expanding and collimating module, and a light combining module, wherein the illumination system is configured to provide an illumination beam, the light valve is disposed on a transmission path of the illumination beam to convert the illumination beam into an image beam, and the projection lens is disposed on a transmission path of the image beam to project the image beam out of the projection device, wherein:

the light source module is configured to generate a first color beam, a second color beam, and a third color beam;

the light splitting element and the beam expanding and collimating module are disposed on transmission paths of the first color beam and the second color beam from the light source module and located between the light source module and the light combining module, and after the first color beam and the second color beam are transmitted to the light splitting and combining element, the first color beam and the second color beam pass through the light splitting and combining element, wherein the transmission paths of the first color beam and the second color beam leaving the light splitting element are coincident, and the first color beam and the second color beam from the light splitting and combining element are expanded and collimated by the beam expanding and collimating module and transmitted to the light combining module;

the reflecting element is disposed on a transmission path of the third color beam from the light source module and located between the light source module and the light combining module, and the third color beam from the light source module is reflected by the reflecting element and transmitted to the light combining module; and the transmission paths of the first color beam, the second color beam, and the third color beam after leaving the light combining module are coincident, and the illumination beam comprises at least one of the first color beam, the second color beam, and the third color beam.

14. The projection device of claim 13, wherein the beam expanding and collimating module comprises a spherical concave lens and a spherical convex lens, and the spherical concave lens is located between the light splitting and combining element and the spherical convex lens.

15. The projection device of claim 13, wherein the light splitting and combining element and the beam expanding and collimating module are not located on the transmission path of the third color beam.

16. The projection device of claim 13, wherein the light splitting and combining element comprises a light pervious substrate, a first light transmissive element, and a second light transmissive element, wherein:

the light pervious substrate has a first optical surface facing the light source module and a second optical surface opposite to the first optical surface;

the first light transmissive element is disposed on the first optical surface;

the second light transmissive element is disposed on the second optical surface;

wherein the first color beam incident on the light pervious substrate is reflected by the first light transmissive element and leaves the light pervious substrate, and after the second color beam incident on the light pervious substrate passes through the first light transmissive element, the second color beam is reflected by the second light transmissive element, and then passes through the first light transmissive element and leaves the light pervious substrate, wherein the transmission paths of the first color beam and the second color beam leaving the light pervious substrate are coincident.

17. The projection device of claim 16, wherein the transmission paths of the first color beam and the second color beam from the light source module to the light splitting and combining element are parallel to each other.

18. The projection device of claim 13, wherein the light combining module comprises a reflecting mirror and a dichroic element, wherein the reflecting mirror is located on the transmission paths of the first color beam and the second color beam to reflect the first color beam and the second color beam from the beam expanding and collimating module to the dichroic element, the dichroic element is located on transmission paths of the third color beam, the first color beam, and the second color beam, and the dichroic element guides the first color beam and the second color beam from the reflecting lens and the third color beam from the reflecting element to be transmitted in a same direction.

19. The projection device of claim 16, wherein the first optical surface is parallel to the second optical surface, a distance between the first color beam and the second color beam is d, a refractive index of the light pervious substrate is n, an angle between the first color beam and a normal of the first optical surface is θ, a thickness of the light pervious substrate is t, and $$t = \frac{\sqrt{n^2 - \sin^2\theta}}{\sin 2\theta} \times d.$$

20. The projection device of claim 16, wherein a material of the first light transmissive element is different from a material of the second light transmissive element or/and a thickness of the first light transmissive element is different from a thickness of the second light transmissive element.

21. The projection device of claim 16, wherein there is an air gap between the second light transmissive element and the light pervious substrate.

22. The projection device of claim 16, wherein a relative included angle between the second light transmissive element and the second optical surface is adjustable, and the relative included angle is −1 degree to 1 degree.

23. The projection device of claim 16, wherein there is an included angle between the first color beam and a normal of the first optical surface of the light pervious substrate, and the included angle is substantially in a range of 30 degrees to 60 degrees.

24. The projection device of claim 13, wherein the light source module comprises a substrate, a first light source unit and a second light source unit, the first light source unit and the second light source unit are disposed at an interval on the substrate, wherein the first light source unit comprises two green laser diodes and blue laser diodes for respectively generating the first color light beam and the second color light beam, and the second light source unit comprises four red laser diodes for generating the third color light beam.

25. The projection device of claim 24, wherein the two green laser diodes and the two blue laser diodes are sequentially arranged along a first direction, the four red laser diodes are sequentially arranged along the first direction, and the second light source unit and the first light source unit are arranged on the substrate along a second direction, wherein the first direction is perpendicular to the second direction.

\*    \*    \*    \*    \*